United States Patent
Osipov et al.

(10) Patent No.: US 10,289,931 B2
(45) Date of Patent: May 14, 2019

(54) METHOD AND SYSTEM FOR SEARCHING IMAGES

(71) Applicant: YANDEX EUROPE AG, Lucerne (CH)

(72) Inventors: Alexander Alexandrovich Osipov, Moscow (RU); Nataliya Stepanovna Baygarova, Moscow (RU); Dmitry Valerievich Ladaev, Zhukovsky (RU)

(73) Assignee: YANDEX EUROPE AG, Lucerne (CH)

( * ) Notice: Subject to any disclaimer, the term of this patent is extended or adjusted under 35 U.S.C. 154(b) by 178 days.

(21) Appl. No.: 15/112,784

(22) PCT Filed: Aug. 28, 2014

(86) PCT No.: PCT/IB2014/064131
§ 371 (c)(1),
(2) Date: Jul. 20, 2016

(87) PCT Pub. No.: WO2015/128707
PCT Pub. Date: Sep. 3, 2015

(65) Prior Publication Data
US 2016/0342860 A1 Nov. 24, 2016

(30) Foreign Application Priority Data

Feb. 28, 2014 (RU) ................................ 2014108239

(51) Int. Cl.
*G06K 9/46* (2006.01)
*G06K 9/62* (2006.01)
(Continued)

(52) U.S. Cl.
CPC ............ *G06K 9/6211* (2013.01); *G06F 16/51* (2019.01); *G06F 16/5838* (2019.01); *G06K 9/4676* (2013.01)

(58) Field of Classification Search
CPC ................ G06K 9/6211; G06K 9/4676; G06F 17/30256; G06F 17/3028
See application file for complete search history.

(56) References Cited

U.S. PATENT DOCUMENTS 8,254,697 B2    8/2012   Isard et al.
8,447,107 B1    5/2013   Dhua et al.
(Continued)

FOREIGN PATENT DOCUMENTS

RU        2364921 C2    7/2004
WO     2004061698 A1    7/2004
(Continued)

OTHER PUBLICATIONS

International Search Report from PCT/IB2014/064131, dated Jan. 6, 2015, Blaine R. Copenheaver.

*Primary Examiner* — Menatoallah Youssef
(74) *Attorney, Agent, or Firm* — BCF LLP

(57) ABSTRACT

There is disclosed a method of generating an index of images, the index of images for enabling comparison of the image against other images, the method executable at a server. The method comprises: determining at least one key for the index, the at least one key including at least a portion of a visual features composite parameter associated with an image to be indexed, the visual features composite parameter having been determined by executing steps of; identifying a first local region of the image and a second local region of the image.

23 Claims, 8 Drawing Sheets

(51) Int. Cl.
  *G06F 16/51*   (2019.01)
  *G06F 16/583*  (2019.01)

(56) References Cited

U.S. PATENT DOCUMENTS

2010/0278439 A1     11/2010  Lennington et al.
2013/0121600 A1*    5/2013   Lin ..................... G06K 9/4676
                                                        382/224
2017/0364536 A1*    12/2017  Di ........................ G06F 16/583

FOREIGN PATENT DOCUMENTS

WO    2005089167 A2    9/2005
WO    2012049681 A2    4/2012

\* cited by examiner

| VFCP 304 | IMAGE 212<br>IMAGE 214 |
|---|---|
| VFCP 306 | IMAGE 204<br>IMAGE 206<br>IMAGE 218<br>IMAGE 216 |
| VFCP 308 | IMAGE 208<br>IMAGE 210<br>IMAGE 214<br>IMAGE 216 |
| VFCP 310 | IMAGE N |

*FIG. 3*

METHOD AND SYSTEM FOR SEARCHING IMAGES

CROSS-REFERENCE

The present application claims convention priority to Russian Patent Application No. 2014108239, filed Feb. 28, 2014, entitled "A METHOD AND A SYSTEM FOR SEARCHING IMAGES" (СПОСОБ ОБРАБОТКИ ИЗОБРАЖЕНИЯ, СПОСОБ СОЗДАНИЯ ИНДЕКСА ИЗОБРАЖЕНИЯ СПОСОБ ОБНАРУЖЕНИЯ СООТВЕТСТВИЯ ИЗОБРАЖЕНИЮ ИЗ ХРАНИЛИЩА ИЗОБРАЖЕНИЙ И СЕРВЕР ВАРИАНТЫ )) which is incorporated by reference herein in its entirety.

FIELD

The present technology relates to methods of conducting searches in general and specifically to a method and a system of searching images.

BACKGROUND

It is often required to search images—be it in a database or on a network. Sometimes, a given user may be looking for a specific image. However, in many circumstances, it may be desirable to locate near identical images—these are the images that are nearly duplicate of each other.

For example, it may be desirable to locate images of the same landscape item taken from different vantage point. This is generally known as a "text to image" search. Several scenarios are possible. Just as an example, one user may be specifically looking for pictures of the Niagara Falls. It is known for the user to access a search engine, such as for example the Yandex™ search engine located at www.yandex.ru (or any other commercially available or proprietary search engine) to type in her search query—"Niagara Falls". Responsive to the search query (and depending on the particular implementation of the search engine), the search engine may return a set of drawings matching the search query (typically, if the search engine is implemented as a vertical search engine or if the user executes a vertical search within a general search engine) or a mix of image results and other web resources, both responsive to the user search query.

Alternatively, the user may have an image and may be desirous of either finding similar images or determining what the image in her possession actually depicts. This is generally referred to as "image-to-image" or "search by image" searching. Also, those of skill in the art refer to this process as "content-based image retrieval" process. For example, the user may have an image depicting a waterfall and may not be aware which waterfall the image actually depicts. The user may be desirous of executing a search, whereby the image in her possession, in effect, is used as a search string.

A typical image-based search is further challenged by the fact that one needs to deal with a repository of images that contains many various images. Within today's implementations of image repositories, it is conceivable, that a given image repository may contain hundreds of thousands of images or even more. For example, it is estimated that there are well over a billion images available within various web resources on the Internet. A known approach to large scale image retrieval has been based on simple text-retrieval systems using the analogy of "visual words". In other words, the known approaches to searching images are based on a so-called bag-of-visual-word (BoW) representation of images.

Pursuant to the typical BoW approach, images are scanned for "salient" regions and a high-dimensional descriptor is computed for each region. These descriptors are then quantized. A visual vocabulary is used to transform the continuous feature space into a discrete word space. This step typically consists of learning a vector quantizer, typically by k-means clustering, and using it to map the descriptors into visual words (forming a visual vocabulary). Typically, descriptors are quantized by finding their nearest centroid. An image is then represented as a bag of visual words, and these are entered into an index for later querying and retrieval. The spatial information is usually reintroduced as a post-processing step to re-rank the retrieved images, through a spatial verification like RANSAC.

Image querying is typically accomplished in two steps: searching and post-processing. During the searching step, similar images are retrieved from the large database and an initial ranking is generated. The most popular approach is to index images with inverted files to facilitate fast access to the images with common visual words. The post-processing step provides a more precise ranking of the retrieved images, usually through spatial verification.

SUMMARY

It is an object of the present technology to ameliorate at least some of the inconveniences present in the prior art.

Inventors have developed embodiments of the present technology based on their appreciation of at least one shortcoming associated with known approaches to the large scale image retrieval. Inventors have appreciated that within the current two-stage approach to searching images in large-scale database, the step of validating local descriptors requires significant computational power. In the absence of such computational power or in case of an inefficient of use of the existing computational power, the search of a given image in a large scale image repository may take unacceptable amount of time.

According to embodiments of the present technology, there is provided a method of searching large scale repository of images based on "visual features composite parameter" rather than visual words. Generally speaking, the visual features composite parameter, or simply a "VFCP" is a tuple of local descriptors selected from at least two regions of the image. In other embodiments of the present technology, the VFCP is a tuple of at least two local descriptors (from the two respective regions of the image) and a region relationship parameter characterizing a relationship between the two respective regions. Generally speaking the region relationship parameter can be implemented as a parameter characterizing geometric co-location of the two respective regions of the image or, alternatively, as a parameter characterizing geometric parameter of a region different from the two-respective regions. Alternatively, the region relationship parameter can be implemented as a parameter characterizing visual relationship between the two respective regions or, alternatively, as a parameter characterizing a visual parameter of a region different from the two-respective regions. The visual relationship can be defined in terms of a ratio of contrast in the two respective regions, color relationships, respective scale between the two respective regions and the like. In some other implementations, the visual relationship parameter can combine both the geometric co-location and visual relationship parameters characterizing the two respective regions of the image.

According to a first broad aspect of the present technology, there is provided a method of processing an image to enable indexing and comparison of the image against other images, the method executable at a server. The method comprises: identifying a first local region of the image and a second local region of the image; determining a first visual word associated with the first local region of the image and a second visual word associated with the second local region of the image; determining a visual features composite parameter associated with the image, the visual features composite parameter comprising the first visual word and the second visual word.

In some implementations of the method, the visual features composite parameter further comprises relationship information between the first local region and the second local region.

In some implementations of the method, the relationship information comprises spatial information between the first local region and a second local region.

In some implementations of the method, the relationship information comprises visual relationship information between the first local region and the second local region.

In some implementations of the method, the visual relationship information comprises at least one of respective scales relationship, respective color relationship and respective contrast relationship.

In some implementations of the method, the relationship information comprises at least one of (i) spatial information between the first local region and a second local region and (ii) visual relationship information between the first local region and the second local region.

In some implementations of the method, the method further comprises receiving the image over a communication network.

In some implementations of the method, the identifying is executed on a random basis.

In some implementations of the method, the identifying is executed on a pre-defined algorithm.

In some implementations of the method, the pre-defined algorithm includes selecting the first region and the second region such that they are spaced apart within the image by a maximum possible distance.

In some implementations of the method, the pre-defined algorithm includes selecting the first region and the second region such that they are visually as different as possible.

According to another broad aspect of the present technology, there is provided a method of generating an index of images, the index of images for enabling comparison of the image against other images, the method executable at a server. The method comprises: determining at least one key for the index, the at least one key including at least a portion of a visual features composite parameter associated with an image to be indexed, the visual features composite parameter having been determined by executing steps of: identifying a first local region of the image and a second local region of the image; determining a first visual word associated with the first local region of the image and a second visual word associated with the second local region of the image; determining a visual features composite parameter associated with the image, the visual features composite parameter comprising the first visual word and the second visual word; storing an indication of the image matching the visual features composite parameter in a posting list associated with the at least one key.

In some implementations of the method, the portion comprises the first visual word and the second visual word.

In some implementations of the method, the portion comprises quantized the first visual word and the second visual word.

In some implementations of the method, the portion comprises the first visual word and the second visual word and a quantized spatial relationship parameter between the first region and the second region.

In some implementations of the method, the portion comprises the first visual word and the second visual word and a quantized visual relationship parameter between the first region and the second region.

In some implementations of the method, the portion comprises the first visual word and the second visual word and a combination of (i) a quantized spatial relationship parameter between the first region and the second region and (ii) a quantized visual relationship parameter between the first region and the second region.

In some implementations of the method, the portion comprises the entire visual features composite parameter, with each parameter within the visual features composite parameter is quantized. In some implementations, each parameter within the visual features composite parameter is independently quantized from others one within the visual features composite parameter.

In some implementations of the method, the method further comprises storing remainder of the visual features composite parameter in the posting list.

According to another broad aspect of the present technology, there is provided a method of locating a match to an image from a repository of images, the repository of images containing a plurality of images, the method executable at a server. The method comprises: receiving an indication of the image; determining a search image visual features composite parameter associated with the image; conducting a multi-stage search including the steps of: selecting candidate images from the plurality of images, selecting being executed by accessing an index, the index correlating a given one of visual features composite parameters of the images contained within the plurality of images and the matching ones from the images contained within the plurality of images; validating candidate images vis-a-vis the search image using respective local descriptors. In some implementations, validating of the candidates images is executed as geographic validation or a validation using respective local descriptors and their location within the candidate images (and, respectively, the search image).

In some implementations of the method, the search image visual features composite parameters comprises a first visual word associated with a first region of the search image, a second visual word associated with a second region of the search image.

In some implementations of the method, the search image visual features composite parameter further comprises relationship information between the first local region and the second local region.

In some implementations of the method, the relationship information comprises spatial information between the first local region and a second local region.

In some implementations of the method, the relationship information comprises visual relationship information between the first local region and the second local region.

In some implementations of the method, the visual relationship information comprises at least one of respective scales relationship, respective color relationship and respective contrast relationship.

In some implementations of the method, the relationship information comprises at least one of (i) spatial information between the first local region and a second local region and (ii) visual relationship information between the first local region and the second local region.

In some implementations of the method, a respective one of the visual features composite parameter being associated with a respective one of the images comprises a first visual word associated with a first region of the respective image, a second visual word associated with a second region of the respective image.

In some implementations of the method, the respective one of the visual features composite parameter further comprises relationship information between the first local region and the second local region.

In some implementations of the method, the relationship information comprises spatial information between the first local region and a second local region.

In some implementations of the method, the relationship information comprises visual relationship information between the first local region and the second local region.

In some implementations of the method, the visual relationship information comprises at least one of respective scales relationship, respective color relationship and respective contrast relationship.

In some implementations of the method, the relationship information comprises at least one of (i) spatial information between the first local region and a second local region and (ii) visual relationship information between the first local region and the second local region.

In some implementations of the method, the method further comprising prior to the receiving, populating the index using the visual features composite parameter of the images.

According to another broad aspect of the present technology, there is provided a server comprising non-transient computer-readable medium storing computer-executable instructions, which instructions when executed are configured to render the server operable to execute a method of processing an image to enable indexing and comparison of the image against other images, the method comprising: identifying a first local region of the image and a second local region of the image; determining a first visual word associated with the first local region of the image and a second visual word associated with the second local region of the image; determining a visual features composite parameter associated with the image, the visual features composite parameter comprising the first visual word and the second visual word.

According to another broad aspect of the present technology, there is provided a server comprising non-transient computer-readable medium storing computer-executable instructions, which instructions when executed are configured to render the server operable to execute a method of generating an index of images, the index of images for enabling comparison of the image against other images, the method comprising: determining at least one key for the index, the at least one key including at least a portion of a visual features composite parameter associated with an image to be indexed, the visual features composite parameter having been determined by executing steps of: identifying a first local region of the image and a second local region of the image; determining a first visual word associated with the first local region of the image and a second visual word associated with the second local region of the image; determining a visual features composite parameter associated with the image, the visual features composite parameter comprising the first visual word and the second visual word; storing an indication of the image matching the visual features composite parameter in a posting list associated with the at least one key.

According to another broad aspect of the present technology, there is provided a server comprising non-transient computer-readable medium storing computer-executable instructions, which instructions when executed are configured to render the server operable to execute a method of locating a match to an image from a repository of images, the repository of images containing a plurality of images, the method comprising: receiving an indication of the image; determining a search image visual features composite parameter associated with the image; conducting a multi-stage search including the steps of: selecting candidate images from the plurality of images, selecting being executed by accessing an index, the index correlating a given one of visual features composite parameters of the images contained within the plurality of images and the matching ones from the images contained within the plurality of images; validating candidate images vis-a-vis the search image using respective local descriptors. In some implementations, validating of the candidates images is executed as geographic validation or a validation using respective local descriptors and their location within the candidate images (and, respectively, the search image).

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 depicts a non-limiting embodiment of an index 300 maintained by a server of the system 100 of FIG. 1.

DETAILED DESCRIPTION

Figure 1:
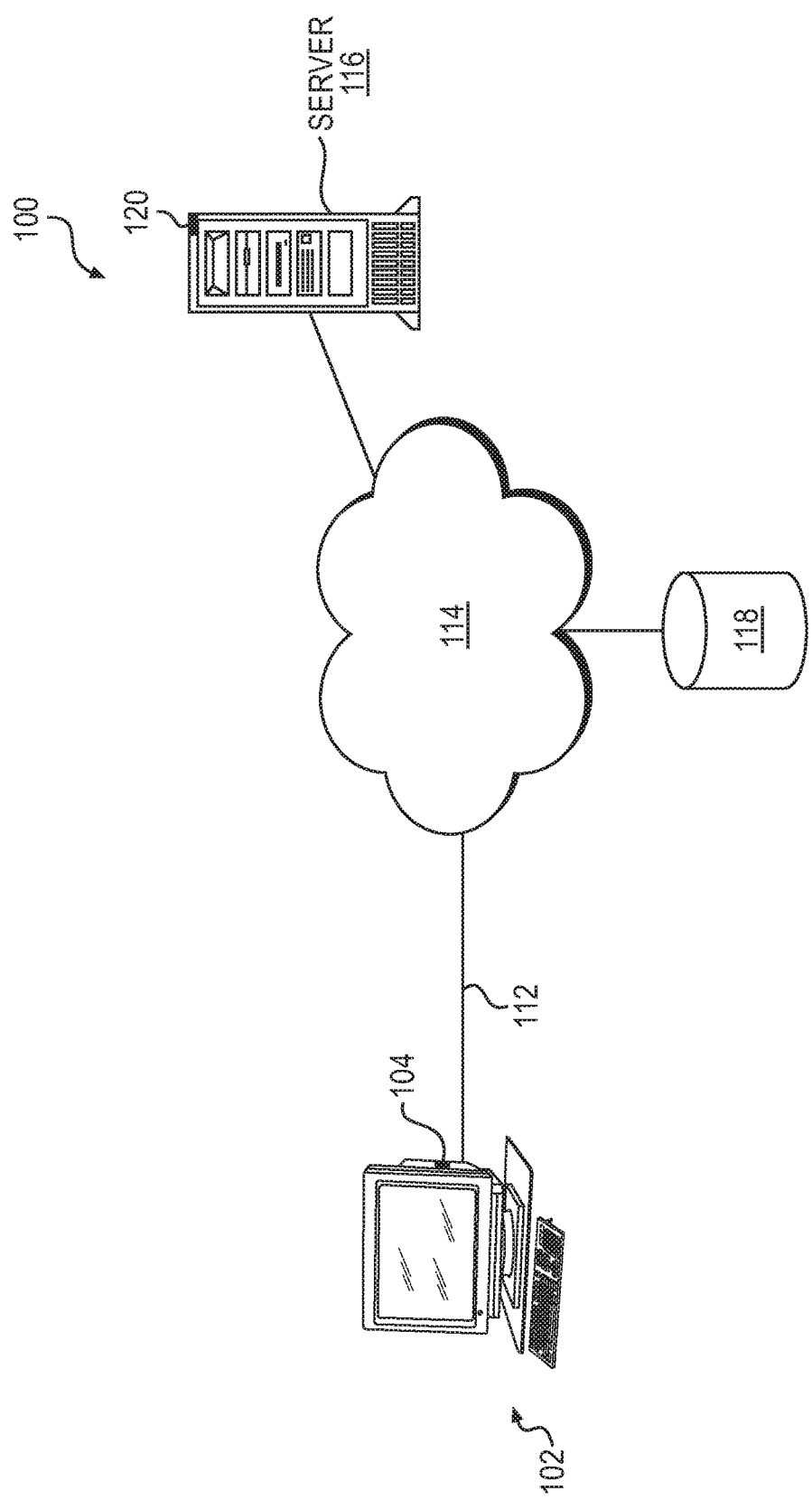
FIG. 1 depicts a system 100 configured to implement various embodiments of the present technology.

With reference to FIG. 1, there is depicted a system 100, the system implemented according to embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). Within the depiction of FIG. 1, the electronic device 102 is implemented as the person computer (desk top).

The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may be embodied in a user accessing a web site associated with a search engine to access the search application 104. For example, the search application can be accessed by typing in an URL associated with Yandex search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

The electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the communication device 102 is implemented. Merely as an example and not as a limitation, in those embodiments of the present technology where the electronic device 102 is implemented as a wireless communication device (such as a smart-phone), the communicated link 102 can be implemented as a wireless communication link (such as but not limited to, a 3G communications network link, a 4G communications network link, a Wireless Fidelity, or WiFi® for short, Bluetooth® and the like). In those examples, where the communication device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementational details for the electronic device 102, the communication link 112 and the communications network 114. As such, by no means, examples provided herein above are meant to limit the scope of the present technology.

Also coupled to the communications network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

In some embodiments of the present technology, the server 116 is under control and/or management of a search engine provider, such as, for example, an operator of the Yandex search engine. Alternatively, the server 116 can be under control and/or management of a service provider.

There is also provided an image repository 118. In some embodiments of the present technology the image repository 118 can be implemented as a storage of a plurality of electronic image files. In alternative embodiments of the present technology, the image repository 118 can be a distributed entity containing a plurality of electronic image files. For example, the image repository 118 can be a conglomeration of some or all of the electronic image files available on various servers (not depicted) within the communications network 114. Alternatively, the image repository 118 can be a conglomeration of electronic image files available at a particular entity, such as a library or a research institution, as an example. In other words, embodiments of the present technology can be useful for indexing and searching images stored on a local computing apparatus (a hard drive, a server or the like) or a remote computing apparatus (server and the like) or a distributed storage (a storage of images distributed amongst a number of servers and the like).

The server 116 is configured to execute an image management application 120. Functionality of the image management application 120 will be discussed in detail below. For the time being, suffice it to state that the image management application 120 is configured to execute some or all of (i) receive an image file; (ii) parse the image contained in the image file for visual words; (iii) generate visual features composite parameter for the image; (iv) generate an index using the visual features composite parameter. The server 116 can also be configured to execute searches based on the index created in (iv), as will be discussed in greater detail below.

Figure 2:
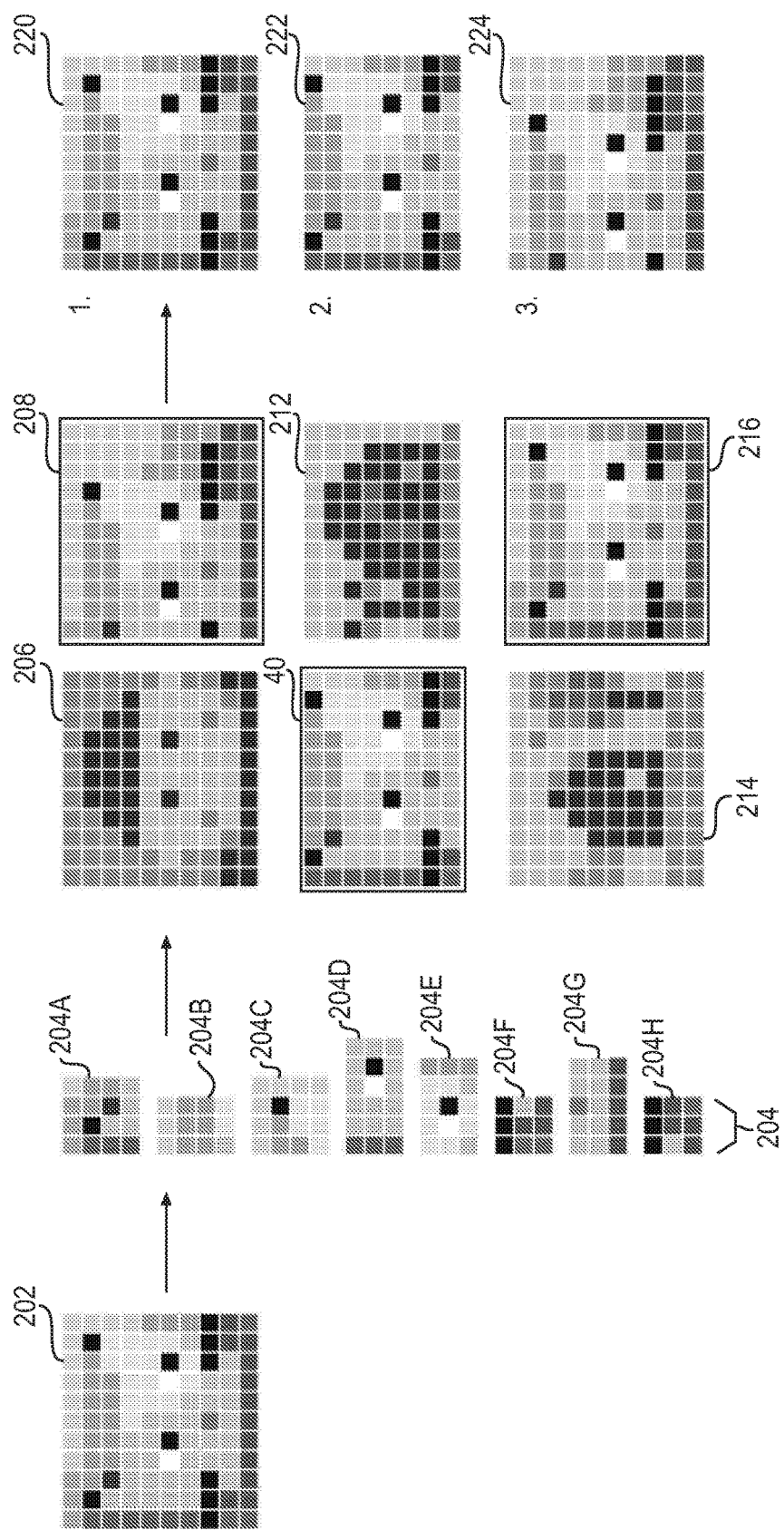
FIG. 2 depicts a schematic representation of various images that can be used for implementing embodiments of the present technology for creating visual features composite parameter.

With reference to FIG. 2, operation of the image management application 120 executed at the server 116 in the context of executing image indexing will be described in greater detail.

Receiving an Image File

The image management application 120 is configured to receive an image file 202. In some embodiments of the present technology, the server 116 can receive the image file 202 from the image repository 118. Within these implementations, the image file 202 can be representative of an image to be indexed. For example, the image file 202 can be one of a plurality of image files within the image repository 118 that require indexing.

Alternatively, the server 116 can receive the image file 202 from the electronic device 102. Within these implementations, the image file 202 can be the image file that the user of the electronic device 102 wants to use as a search string.

Parsing the Image File for Visual Words

The image management application 120 is further configured to parse the image contained in the image file 202 to define visual words associated with the various portions (i.e. various local regions) of the image contained in the image file 202. In a particular example, the image management application 120 is configured to break the image contained in the image file 202 into various regions (also can be selected salient regions, salient regions being selected based on an algorithm to be described herein below), associating each of the regions with respective visual word, schematically depicted in FIG. 2 at 204.

More specifically, the image management application 120 determines local descriptors. Local descriptors describe a particular region of the image contained in the image file 202. For example, the local descriptors can be based on scale-invariant feature transform (SIFT) algorithm. Naturally, any other suitable algorithm can be used.

In some embodiments of the present technology, the image management application 120 uses a visual word vocabulary to define the local descriptors. The usage of the visual vocabularies allows to transform the continuous feature space of the image into a discrete word space. For example, the image management application 120 can use a known vocabulary to get a vector quantizer. As is known, the visual vocabulary is trained on a training set of local descriptors using k-means techniques. Using the vector quantizer, the local descriptors are quantized by finding the nearest centroid and are mapped into visual words using the visual vocabulary.

As an illustration, the image management application 120 defines a visual word 204a, a visual word 204b, a visual word 204c, a visual word 204d, a visual word 204e, a visual word 204f, a visual word 204g and a visual word 204h. Simply put, each of the visual word 204a, the visual word 204b, the visual word 204c, the visual word 204d, the visual word 204e, the visual word 204f, the visual word 204g and the visual word 204h is representative of the corresponding local descriptor of the image 202.

Index the Image for Visual Features Composite Parameter

Next, the image management application 120 is configured to index the image 202 using a "visual features composite parameter". In some embodiments of the present technology, the visual features composite parameter, or simply a "VFCP" is a tuple of local descriptors selected from at least two regions of the image. In other embodiments of the present technology, the VFCP is a tuple of at least two local descriptors (from the two respective regions of the image) and a region relationship parameter characterizing a relationship between the two respective regions of the image.

Generally speaking the region relationship parameter can be implemented as a parameter characterizing geometric co-location of the two respective regions of the image. Alternatively, the region relationship parameter can be implemented as a parameter characterizing visual relationship between the two respective regions. The visual relationship can be defined in terms of a ratio of contrast in the two respective regions, color relationships, respective scale between the two respective regions of the image and the like. In some other implementations, the visual relationship parameter can combine both the geometric co-location and visual relationship parameters characterizing the two respective regions of the image.

It should be apparent to those skilled in the art having the benefit of the teachings of the present technology, that irrespective of the exact implementation of the VFCP described above, a given VFCP is associated with a higher discriminative power compared to the individual local descriptors associated with respective individual regions of the image. By the term "discriminative power" we mean to denote the ability of the VFCP to describe a particular image and to distinguish it from substantially different images or to correlate it to near-identical images.

As an example, the image management application 120 uses the visual word 204a, the visual word 204b, the visual word 204c, the visual word 204d, the visual word 204e, the visual word 204f, the visual word 204g and the visual word 204h; as well as spatial relationship information between the respective ones of the visual word 204a, the visual word 204b, the visual word 204c, the visual word 204d, the visual word 204e, the visual word 204f, the visual word 204g and the visual word 204h to create the visual features composite parameter. The visual features composite parameter can also be thought of as a "visual phrase" or a "high order visual feature".

According to embodiments of the present technology as illustrated by one of the embodiments described in the preceding paragraph, a visual features composite parameter can, therefore, be said to comprise at least two local descriptors associated with respective associated local regions of the image and the region relationship information therebetween (which can be spatial or any other suitable visual relationship parameter). It should be noted that in alternative embodiments, the region relationship information used for the visual features composite parameter generation does not need to be limited to the associated local regions, but can be instead associated with other regions of the image as a whole.

Hence, it can be said that the visual features composite parameter created by the server 116 represent (i) at least two local descriptors associated with respective regions of the image and (ii) a visual relationship characteristic of the at least two respective regions within the image 202.

It is noted that the geometric characteristic used for representing relationship between the visual words may take many forms. For example, the geometric characteristic can be location of one key point associated with the first visual word vis-a-vis location of another key point associated with a second visual word. Geometric characteristic can also be an angle of one key point associated with the first visual word vis-a-vis location of another key point associated with the second visual word.

Figure 8:
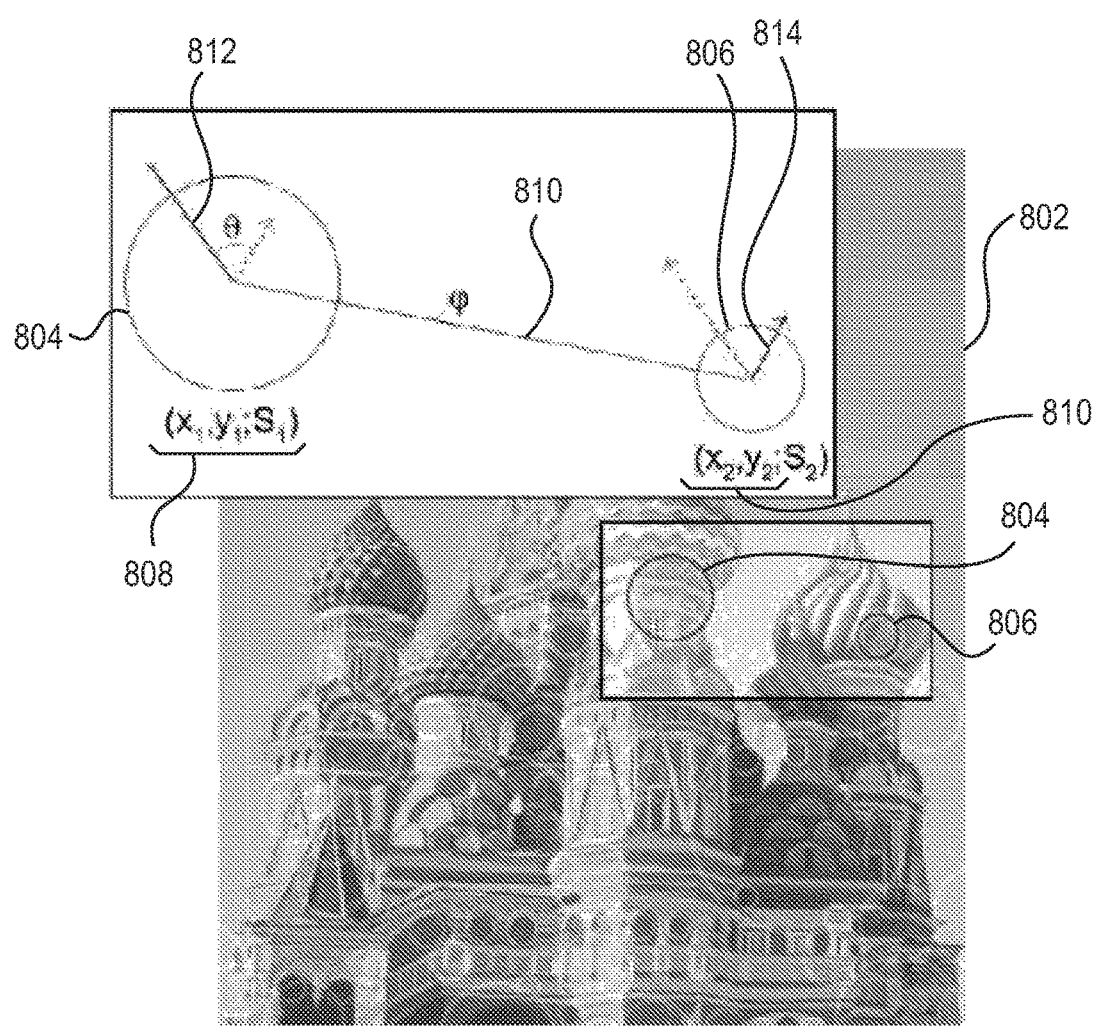
FIG. 8 depicts an example of an image demonstrating determination of the visual features composite parameter according to an embodiment of the present technology.

Just as an illustration of the process of generating the VFCP, a brief reference will now be made to FIG. 8, which depicts a non-limiting example of an image 802, the image 802 being analyzed to generate the VFCP. As an illustration, two local regions have been selected—a first local region 804 and a second local region 806.

The first local region 804 and the second local region 806 are associated with respective parameters 808, 810, which parameters 808, 810 include coordinates and scale, as non-limiting examples. As an illustration, the VFCP can be based on the two respective local descriptors associated with respective first local region 804 and the second local region 806. Alternatively, the VFCP can be based on the two local descriptors associated with respective first local region 804 and the second local region 806 (which local descriptors can be based at least in part of the parameters 808, 810) and a relationship parameter 810 representative of either one or both of geometric and visual relationship between the first local region 804 and the second local region 806 (or, alternatively, the relationship parameter 810 can be representative of visual features of other regions of the image or the image as a whole). In some embodiments, the relationship parameter can be calculated, at least in part, based on the angle $\varphi$, the angle $\varphi$ being an angle between an imaginary horizontal line and the line (depicted in FIG. 8 at 810) between the center point of the first local region 804 and the second local region 806. Additionally or alternatively, the relationship parameter can be calculated, at least in part, based on an angle $\theta$ between the respective dominant vectors 812, 814 of the first local region 804 and the second local region 806.

Returning to the description of FIG. 2, it is noted that the process of receiving, parsing and indexing can be repeated for a plurality of images. Within this illustration and continuing our reference to FIG. 2, the image management application 120 is configured to repeat the steps of receiving, parsing and indexing for each of an image 206, an image 208, an image 210, an image 212, an image 214 and an image 216.

Generate an Index

Next, the image management application 120 is configured to generate an index, an embodiment of which is depicted at 300 in FIG. 3. Within the depicted embodiment, the index 300 correlates each of the visual features composite parameter (or a portion thereof, as will be described momentarily) as a key to an indication of images from the list of indexed images (i.e. the image 202, the image 206, the image 208, the image 210, the image 212, the image 214 and the image 216) where the specific visual features composite parameter is present. It is noted that in some embodiments of the present technology, each component of the visual features composite parameter is quantized. In some embodiments, each component is independently quantized.

The indication of which ones of the image 202, the image 206, the image 208, the image 210, the image 212, the image 214 and the image 216 correlates to a give key can be referred to as a "posting list".

As such, the index 300 correlates <VFCP key 1> 304 with the image 212 and the image 214. The index 300 further correlates <VFCP key 2> 306 with the image 204, the image 206, the image 218 and the image 216. The index 300 further correlates <VFCP key 3> 308 with the image 208, the image 210, the image 214 and the image 216. Finally, the index 300 correlates <VFCP key 4> 310 with a image N, which is meant to generally to denote all other possible correlations maintained within the index 300.

According to embodiments of the present technology, the implementation of the <VFCP key 1> 304, the <VFCP key 2> 306, the <VFCP key 3> 308 and the <VFCP key 4> 310 can be as follows.

For example, the <VFCP key 1> 304, the <VFCP key 2> 306, the <VFCP key 3> 308 and the <VFCP key 4> 310 can be implemented as the above-mentioned visual features composite parameter or "visual phrases". In other embodiments of the present technology, the <VFCP key 1> 304, the <VFCP key 2> 306, the <VFCP key 3> 308 and the <VFCP key 4> 310 can be implemented as a quantized element of the above-mentioned visual features composite parameter. For example, in some embodiments of the present technology, the <VFCP key 1> 304, the <VFCP key 2> 306, the <VFCP key 3> 308 and the <VFCP key 4> 310 are implemented as a quantized local descriptors portions of the visual features composite parameter. Alternatively, the <VFCP key 1> 304, the <VFCP key 2> 306, the <VFCP key 3> 308 and the <VFCP key 4> 310 are implemented as a quantized local descriptors portions and a portion of the associated relationship information between the respective regions of the visual features composite parameter.

In those embodiments, where only a portion of the visual features composite parameter is used as the <VFCP key 1> 304, the <VFCP key 2> 306, the <VFCP key 3> 308 and the <VFCP key 4> 310, the remainder of the respective visual features composite parameters can be stored in the associated posting lists. In these embodiments, the remainder of the respective visual features composite parameters stored in the associated posting lists can be used as an additional tool for selecting candidate images from the list of images stored in the given posting list (will be described in greater detail herein below).

Put another way and by means of a summary, the <VFCP key 1> 304, the <VFCP key 2> 306, the <VFCP key 3> 308 and the <VFCP key 4> 310 can be implemented as at least a portion of the visual features composite parameter. As an example, the at least a portion of the visual features composite parameter can take form of:

a pair of visual words
at least two visual words;
at least two visual words and the associated quantized spatial relationship parameter;
at least two visual words and the associated quantized visual relationship parameter;
at least two visual words and a combination of (i) the associated quantized spatial relationship parameter and (ii) the associated quantized visual relationship parameter;
the entire visual features composite parameter, with each portion of the visual composite parameter being quantized.

Those skilled in the art will appreciate that the larger the portion of the visual feature composite parameter that is used for the <VFCP key 1> 304, the <VFCP key 2> 306, the <VFCP key 3> 308 and the <VFCP key 4> 310, the more discriminative the <VFCP key 1> 304, the <VFCP key 2> 306, the <VFCP key 3> 308 and the <VFCP key 4> 310 will be. By the same token, the more discriminative the <VFCP key 1> 304, the <VFCP key 2> 306, the <VFCP key 3> 308 and the <VFCP key 4> 310 are, the shorter the associated posting lists can be. The shorter the posting list, the more efficient searching of the posting lists is (to be described). Therefore, those of skill in the art having benefits of the teachings of the present technology will be able to select the required implementation of the <VFCP key 1> 304, the <VFCP key 2> 306, the <VFCP key 3> 308 and the <VFCP key 4> 310 based on their specific requirements for the efficiency of the search of the posting lists.

The server 116 can also be configured to execute searches based on the index 300. It is noted that the search may be executed by the image management application 120 or another module or routine executed by the server 116. It is also noted that the server 116 may execute the search on behalf of another entity, such as for example, a search engine. Additionally, a separate entity (such as the search engine) may use the index 300 to execute the search, as will be described below.

Using FIG. 2 as an example, the goal for executing the searches is to determine which ones of a first matched image 220, a second matched image 222 and a third matched image 224 are the same or nearly the same as the image 202. Another goal may be to rank the first matched image 220, the second matched image 222 and the third matched image 224 based on the degree of its resemblance to the image 202.

In some embodiments, server 116 executes a multi-staged search. Generally speaking and still using the illustration of FIG. 2, a first stage is implemented as candidate selections— i.e. selecting specific ones of the first matched image 220, the second matched image 222 and the third matched image 224 based on the degree of its resemblance to the image 202 from the image 202, the image 206, the image 208, the image 210, the image 212, the image 214 and the image 216 (the first matched image 220, the second matched image 222 and the third matched image 224 being selected as candidates based on the degree of matching of its visual features composite parameters to that of the image 202).

At a second stage, (i) a specific one of the first matched image 220, the second matched image 222 and the third matched image 224 based on the degree of its resemblance to the image 202 or (ii) a ranked set of the first matched image 220, the second matched image 222 and the third matched image 224 based on the degree of its resemblance to the image 202 is/are selected as matches for the searched image.

Figure 4:
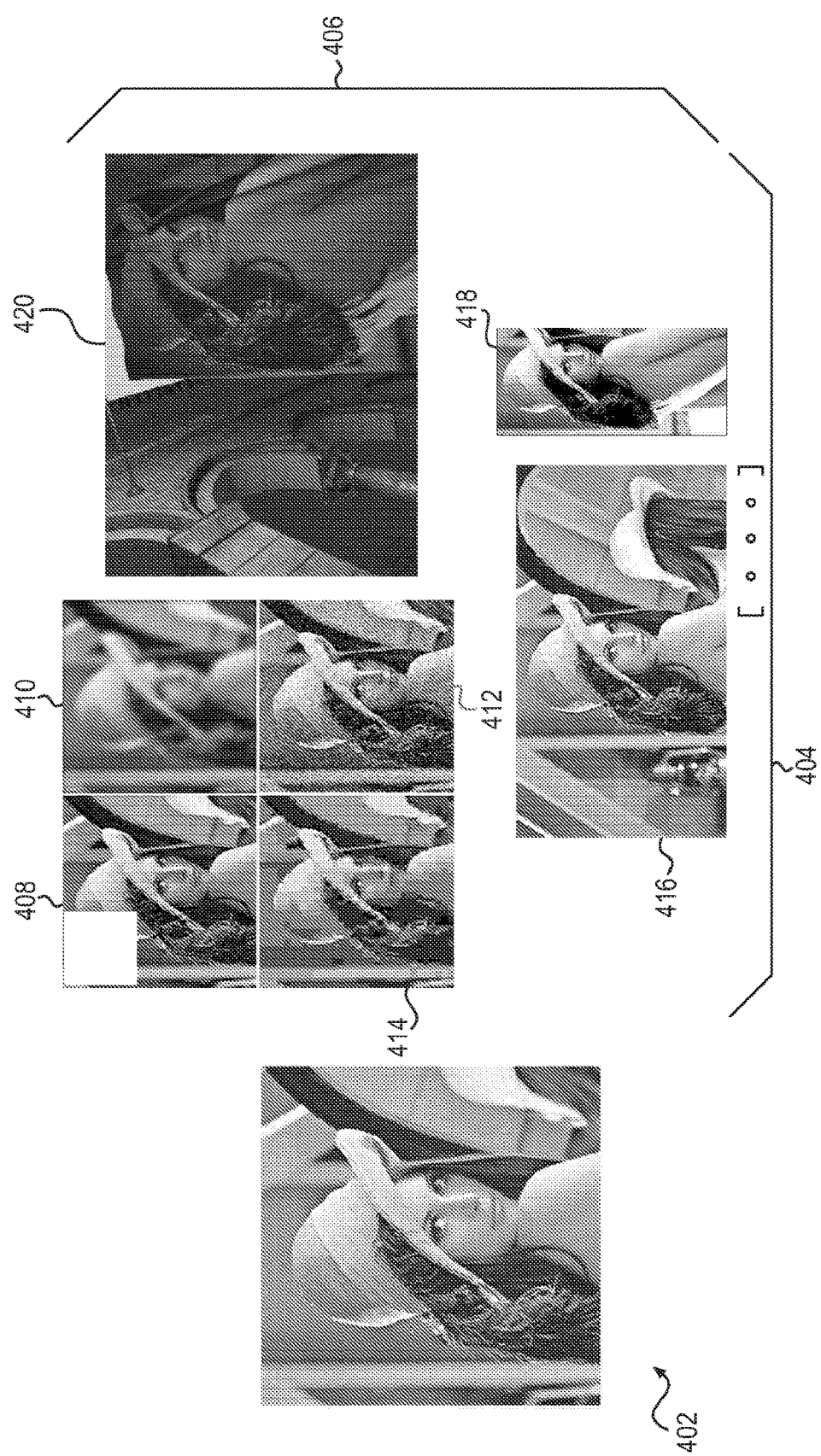
FIG. 4 depicts a representation of various images that can be used while implementing image searches according to various embodiments of the present technology.

For the purposes of the description to be presented herein, it shall be assumed that the user is looking to conduct a search using an image 402, depicted in FIG. 4, as a search query.

It shall also be assumed that the image repository 118 contains a plurality of images 404, the plurality of images including a subset of selected images 406, the subset of selected images 406 including a first image 408, a second image 410, a third image 412, a fourth image 414, a fifth image 416, a sixth image 418 and a seventh image 420.

First, the server 116 analyzes the image 402. According to embodiments of the present technology, the server 116 analyzes the image 402 in a manner substantially similar to what was described above related to the image 202. As such, the server 116 may determine one or more of the visual features composite parameters associated with the image 402. These visual features composite parameters associated with the image 402 shall be referred to as "search image visual features composite parameter".

Stage 1—Candidate Selection.

At the first stage, the server 116 can execute candidate selection routine using the index 300. More specifically, the server 116 accesses the index 300 to determine which ones of the images indexed and stored therein are associated with visual features composite parameter that matches the search image visual features composite parameter. These images can be thought of as "candidate images".

In some embodiments, the server accesses the index 300 to extract candidate images based on at least two visual features composite parameters. In practical terms and using FIG. 4 as an example, the server determines the subset of selected images 406 from the plurality of images 404 based on the matches of the at least two visual features composite parameters.

In some embodiments, the server 116 simply identifies the subset of selected images 406 as part of stage 1. In alternative embodiments, the server 116 optionally ranks the candidates within the subset of selected images 406 as part of stage 1. Within these implementations, the server 116 first retrieves all candidate images matching at least one of the at least two visual features composite parameters and, then optionally, ranks the candidates based on the number of matches to the at least two visual features composite parameters (for example, the more of the at least two visual features composite parameters a given candidate image contains, the higher the ranking).

More specifically, the server 116 can use the visual features composite parameter of the image 402 to compare them with visual features composite parameter of each of the subset of selected images 406. The higher the number of matched visual features composite parameter of the image 402 that match the visual features composite parameter of the given one of the subset of selected images 406, the higher the ranking can be assigned to the given one of the subset of selected images 406.

Just to illustrate this step, let's assume that the server 116 has determined that the search image visual features composite parameter is <VFCP key 1>. The server 116 can then access the index 300 and determine that the candidate images corresponding to the search image visual features composite parameter are image 212 and image 214 (i.e. the images stored in the posting list associated with the <VFCP key 1>.

Hence using this example, the server 116 accesses the index 300 and determines that the subset of selected images 406 includes the first image 408, the second image 410, the third image 412, the fourth image 414, the fifth image 416 and the sixth image 418. As can be seen from the illustration of FIG. 4, the first image 408, the second image 410, the third image 412, the fourth image 414, the fifth image 416 and the sixth image 418 are "near identical" copies of the image 402. Near identical means almost similar, but not the same. Near identical images may of course include images that are the same as the image being searched. For example, the image 408 is a partially cropped version of image 402. The image 410 is a blurred version of the image 402. The image 414 is a low-resolution version of the image 402. The image 412 is another low-resolution version of the image 402, the image 412 having a lot of "noise". The image 416 is an image that includes the image 402 as a portion thereof. The image 418 is a version of the image 402 where the image 418 and the image 402 have a common content portion. The image 420 contains a portion of the image 402 taken from a different vantage point or, in other words, it is has different 3D vantage point.

The reason why each of the subset of selected images 406 is a near-identical (or the same) as the image 402 should be easy to understand. Recalling that the candidate selection is executed using the index 300 and recalling that index 300 was generated using at least a portion the visual features composite parameter as the key, in order for a given image to "fall within" the subset of selected images 406 it would need to share at least one visual features composite parameter which is the same as the search image visual features composite parameter.

A particular technical affect attributable to the execution of stage 1 using the index 300 generated in accordance with embodiments of the present technology may include a faster selection of the candidate images. This can be based on the fact that the image visual features composite parameter as used herein is more discriminative than the traditional visual words.

In some embodiments of the present technology, as part of stage 1, the server 116 checks all entries in the index 300. In alternative embodiments, the server 116 may execute stage 1 using selected ones of the entries in the index 300. For example, the server 116 may determine that some of the image 402 being search is associated with some of the <VFCP key 1> 304, the <VFCP key 2> 306, the <VFCP key 3> 308 and the <VFCP key 4> 310. The server 116 may further determines that one subset of the some of <VFCP key 1> 304, the <VFCP key 2> 306, the <VFCP key 3> 308 and the <VFCP key 4> 310 is more discriminative than the other subset of the some of <VFCP key 1> 304, the <VFCP key 2> 306, the <VFCP key 3> 308 and the <VFCP key 4> 310. This determination of more discriminative ones of the <VFCP key 1> 304, the <VFCP key 2> 306, the <VFCP key 3> 308 and the <VFCP key 4> 310 can be made, for example, on how frequent a given one of the <VFCP key 1> 304, the <VFCP key 2> 306, the <VFCP key 3> 308 and the <VFCP key 4> 310 is. Within these embodiments, the server 116 can execute stage 1 based on the more discriminative subset of the <VFCP key 1> 304, the <VFCP key 2> 306, the <VFCP key 3> 308 and the <VFCP key 4> 310. A particular technical effect of these embodiments includes a more efficient process of candidate selection.

Stage 2—verification and ranking

Next, at stage 2, the server 116 executes verification and ranking (or re-ranking if the candidate images have been optionally ranked as part of stage 1, as has been described above) of those within the subset of selected images 406.

In some embodiments of the present technology, the server 116 can execute geometric validation of candidates that form part of the subset of selected images 406. More specifically, the server 116 can be configured to validate candidate images vis-a-vis the search image using respective local descriptors.

In some embodiments of the present technology, the server 116 checks the consistency of the geometric co-location of the local descriptors between the image 402 and each of the ones within the subset of images 406.

In order to execute such geometric validation, the server 116 needs to appreciate the geometric location of the local descriptors. Such information can be stored within the index 300, for example, as part of or otherwise linked to the visual features composite parameter information. Alternatively, such information can be stored in a separate index, linked to each one of the subset of images 406 by means of a respective image identifier.

Several algorithms can be used to execute the geometric validation. In some embodiments of the present technology, the server 116 utilizes RANSAC algorithm. Alternatively, the server 116 can employ "Clustering with Hough transform" algorithm.

Using the results of the geometric validation, the server 116, ranks (or re-ranks if the candidate images have been optionally ranked as part of Stage 1, as has been described above) those candidate images within the subset of selected images 406 that have been validated as candidate images using geometric validation. More specifically, the server 116 can use the number of local features that are consistently located between the image 402 being searched and the candidate images from the subset of selected images 406 as an indicator for ranking.

Additionally or optionally, a step of a thumb-validation can be executed. In other words, the server 116 can, additionally or optionally, check a given one of the selected candidates of the subset of selected images 406 vis-a-vis the image 402, using respective thumbnails of the given one of the selected candidates of the subset of selected images 406 and the image 402. In some embodiments, the thumbnail validation is executed in a "pixel by pixel" comparison mode. In some implementations, the server 116 can additionally use the spatial information of the respective regions of the given one of the selected candidates of the subset of selected images 406 and the image 402.

Using the approaches described herein, the server 116 can determine that one of the fifth image 416 and the sixth image 418 is the best match to the image 402 being searched. Alternatively, the server 116 can determine that both the fifth image 416 and the sixth image 418 are matches to the searched image and provide them to the user in a ranked order according to the level of relevancy to the searched image 402. Additionally, the server 116 can present other ones of the subset of selected images 406, even if they are less relevant, in a ranked list fashion.

In some embodiments of the present technology, some of the stage 1 and/or stage 2 processes can be executed "off-line" in the sense of being executed before the user attempts to perform a particular image search. In alternative embodiments of the present technology, some of the steps of stage 2 can be performed off-line to further shorten the length of posting lists generated as part of stage 1. For example, the server 116 can analyze the images contained in the posting lists and determine near identical images. The server 116 can then select a representative image for each group of the near identical images and only store an indication of the representative image for each group of identical images in the posting lists of the index 300. Naturally, a complete list of the near identical images for each of the representative images can be stored in a separate database and later retrieved. By doing this additional optional representative selection, the server 116 can even further shorten the time required for selection of candidates when stage 1 is executed on line, or in other words, when the user performs an image search using the server 116.

Figure 5:
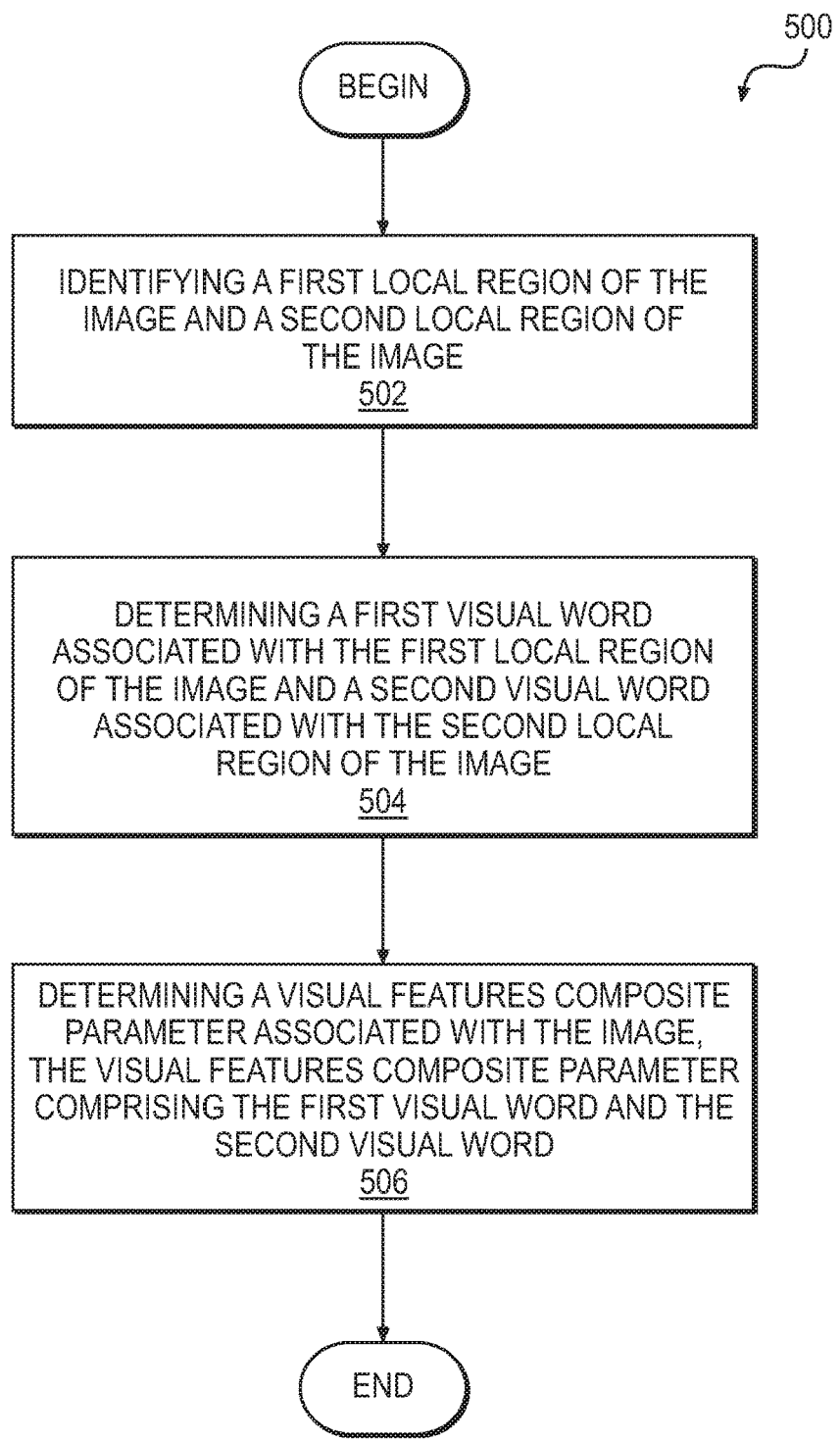
FIG. 5 depicts a block diagram of a method 500, method 500 being implemented in accordance with non-limiting embodiments of the present technology.

Accordingly, given embodiments of the present technology, a method of processing an image to enable indexing and comparison of the image against other images can be executed. With reference to FIG. 5, there is depicted a block diagram of steps of a method 500. The method 500 can be executable as the server 116. As such, the server 116 can include a non-transient computer readable medium containing computer-executable instructions, which instructions when executed case the server 116 to execute the steps of the method 500.

Step 502—identifying a first local region of the image and a second local region of the image The method 500 starts at step 502, where the server 116 identifies a first local region of the image and a second local region of the image.

In some embodiments, the first local region of the image and second local region of the image can be randomly picked. In other embodiments, the first local region of the image and second local region of the image can be picked based on a pre-defined algorithm. For example, the first local region of the image and second local region of the image can be picked such that that are located as far away from each other as possible. As another example, the first local region of the image and second local region of the image can be picked such that that they are visually as different as possible (for example, different contrast, different scale, etc). Naturally, any other algorithm for selecting the first region and the second region can be used.

The method 500 then proceeds to step 504.

Step 504—determining a first visual word associated with the first local region of the image and a second visual word associated with the second local region of the image Next, at step 504, the server determines a first visual word associated with the first local region of the image and a second visual word associated with the second local region of the image. The various embodiments for determining the visual words (i.e. local descriptors) associated with the various regions of the image have been described at length above.

The method 500 then proceeds to step 506.

Step 506—determining a visual features composite parameter associated with the image, the visual features composite parameter comprising the first visual word and the second visual word Next, at step 506, the server 116 determines a visual features composite parameter associated with the image, the visual features composite parameter comprising the first visual word and the second visual word.

According to some embodiments of the present technology, the visual features composite parameter can comprise at least two visual words (i.e. the first visual word and the second visual word) associated with respective associated regions of the image and the region relationship information therebetween (which can be spatial or any other suitable visual relationship parameter). It is noted that the visual features composite parameter can be implemented in a number of other possible variants, as has been described in this application.

The execution of method 500 can then terminate or be repeated for another image.

Figure 6:
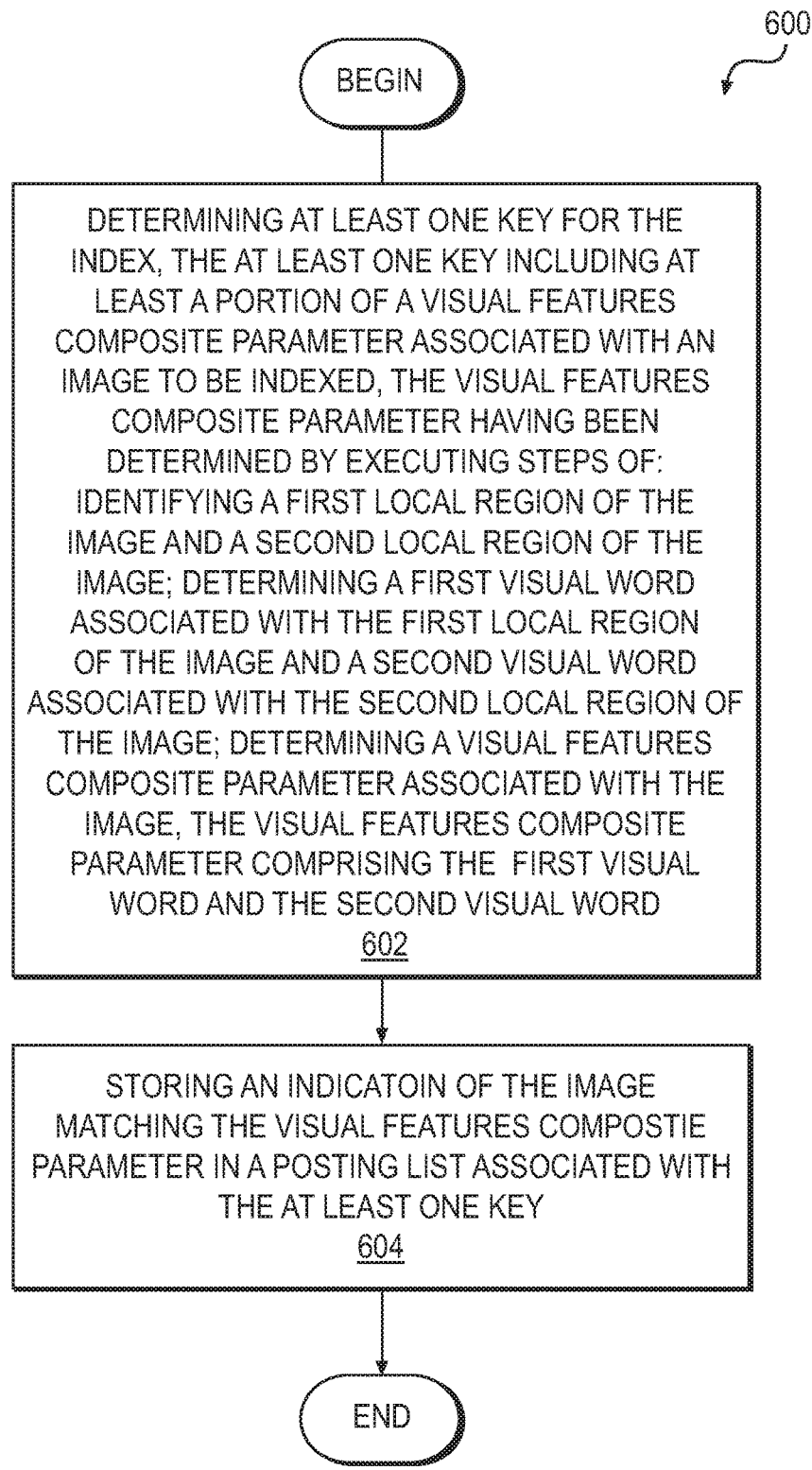
FIG. 6 depicts a block diagram of a method 600, method 600 being implemented in accordance with other non-limiting embodiments of the present technology.

In alternative non-limiting embodiments, a method of generating an index of images, the index of images for enabling comparison of the image against other images can be executed. With reference to FIG. 6, there is depicted a block diagram of steps of a method 600. The method 600 can be executable as the server 116. As such, the server 116 can include a non-transient computer readable medium containing computer-executable instructions, which instructions when executed case the server 116 to execute the steps of the method 600.

602—determining at least one key for the index, the at least one key including at least a portion of a visual features composite parameter associated with an image to be indexed, the visual features composite parameter having been determined by executing steps of: identifying a first local region of the image and a second local region of the image to be indexed; determining a first visual word associated with the first local region of the image to be indexed and a second visual word associated with the second local region of the image to be indexed; determining a visual features composite parameter associated with the image to be indexed, the visual features composite parameter comprising the first visual word and the second visual word Within the implementations of method 600, as part of step 602, the server 116 determines at least one key for the index, the at least one key including at least a portion of a visual features composite parameter associated with an image to be indexed. Within the context of the method 600, the visual features composite parameter has been determined by executing steps of: identifying a first local region of the image and a second local region of the image; determining a first visual word associated with the first local region of the image and a second visual word associated with the second local region of the image; determining a visual features composite parameter associated with the image, the visual features composite parameter comprising the first visual word and a second visual word.

The method 600 then proceeds to the executions of step 604.

Step 604—storing an indication of the image matching the visual features composite parameter in a posting list associated with the at least one key Next, at step 604, the server 116 stores an indication of the image (or images) matching the visual features composite parameter in a posting list associated with the at least one key.

The steps 602 and 604 can be repeated for al the images that needed to be indexed or added to the index at a later time.

Figure 7:
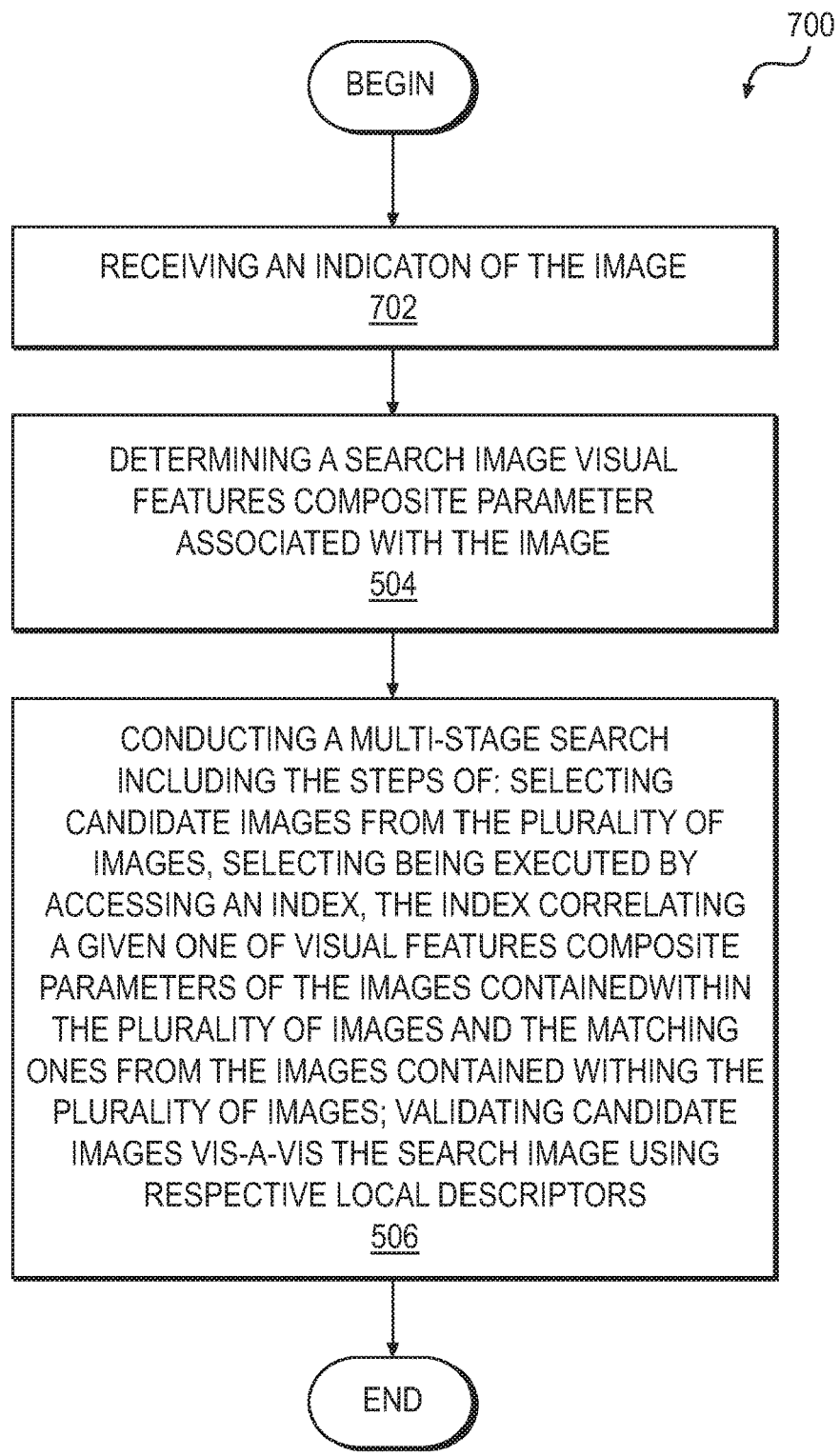
FIG. 7 depicts a block diagram of a method 700, method 700 being implemented in accordance with yet another non-limiting embodiment of the present technology.

In alternative non-limiting embodiments, a method of locating a match to an image from a repository of images, the repository of images containing a plurality of images, can be executed. With reference to FIG. 7, there is depicted a block diagram of steps of a method 700. The method 700 can be executable as the server 116. As such, the server 116 can include a non-transient computer readable medium containing computer-executable instructions, which instructions when executed case the server 116 to execute the steps of the method 700.

Step 702—receiving an indication of the image

The method 700 starts at step 702, where the server 116 receives an indication of the image to be searched. Within embodiments of the present technology, the server 116 can appreciate the image to be searched by means of a user executing an image-based search and loading the image to be searched into an interface of a search engine, as an example.

The method 700 then proceeds to the executions of step 704.

Step 704—determining a search image visual features composite parameter associated with the image Next, at step 704, the server 116 determines a search image visual features composite parameter associated with the image. The process for determining the visual feature composite parameter has been described at length above.

The method 700 then proceeds to the executions of step 706.

Step 706—conducting a multi-stage search including the steps of: selecting candidate images from the plurality of images, selecting being executed by accessing an index, the index correlating a given one of visual features composite parameters of the images contained within the plurality of images and the matching ones from the images contained within the plurality of images; validating candidate images vis-a-vis the search image using respective local descriptors Next, at step 706, the server conducts a multi-stage search including the steps of: selecting candidate images from the plurality of images, selecting being executed by accessing an index, the index correlating a given one of visual features composite parameters of the images contained within the plurality of images and the matching ones from the images contained within the plurality of images; validating candidate images vis-a-vis the search image using respective local descriptors.

In some alternative embodiments of the present technology, the server 116 can also execute a thumbnail validation, as has been described above.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing an image to enable indexing and comparison of the image against other images, the method executable at a server, the method comprising:
   identifying a first local region of the image and a second local region of the image;
   determining a first visual word associated with the first local region of the image and a second visual word associated with the second local region of the image, the first visual word and the second visual word being indicative of local descriptors of the first local region and of the second local region, a given local descriptor being indicative of visual features of a respective local region;
   determining a visual features composite parameter associated with the image, the visual features composite parameter comprising the first visual word and the second visual word, the visual features composite parameter further comprising relationship information characterizing a relationship between the first local region and the second local region, the relationship information comprising a geometric co-location information of the first local region of the image and the second local region of the image, the geometric co-location information comprising a location of one key point associated with the first visual word relative to a location of one other key point associated with the second visual word;

determining at least one key for an index of images, the at least one key including at least a portion of the visual features composite parameter associated with the image to be indexed; and storing an indication of the image matching the visual features composite parameter in a posting list associated with the at least one key.

2. The method of claim 1, wherein said geometric co-location information further comprises an angle associated with one key point relative to the first visual word relative to a location of one other key point associated with the second visual word.

3. The method of claim 1, wherein said relationship information further comprises visual relationship information associated with at least one of: (i) between the first local region and the second local region, (ii) other regions of the image, and (iii) image as a whole.

4. The method of claim 3, wherein said visual relationship information comprises at least one of respective scales relationship, respective color relationship and respective contrast relationship.

5. The method of claim 1, wherein said relationship information further comprises at least one of; (i) visual relationship information between the first local region and the second local region, (ii) spatial information associated with other regions of the image, and (iii) visual information associated with other regions of the image.

6. The method of claim 1, wherein: said identifying is executed on a pre-defined algorithm, and said pre-defined algorithm includes selecting the first region and the second region such that they are at least one of: (i) spaced apart within the image by a maximum possible distance, and (ii) visually as different as possible.

7. The method of claim 1, wherein the portion comprises the first visual word and the second visual word.

8. The method of claim 1, wherein the portion comprises the first visual word and the second visual word and at least one of: (i) a quantized spatial relationship parameter between the first region and the second region, and (ii) a quantized visual relationship parameter between the first region and the second region.

9. The method of claim 1, wherein the portion comprises the entire visual features composite parameter, each portion of the visual features composite parameter being quantized.

10. The method of claim 1, further comprising storing remainder of the visual features composite parameter in the posting list.

11. A method of locating a match to an image from a repository of images, the repository of images containing a plurality of images, the method executable at a server, the method comprising:

receiving an indication of the image;
determining a search image visual features composite parameter associated with the image, the visual features composite parameter further comprising relationship information characterizing a relationship between a first local region associated with a first visual word and a second local region of the image associated with a second visual word, the first visual word and the second visual word being indicative of local descriptors of the first local region and of the second local region, a given local descriptor being indicative of visual features of a respective local region, the relationship information comprising a geometric co-location information of the first local region of the image and the second local region of the image, the geometric co-location information comprising a location of one key point associated with the first visual word relative to a location of one other key point associated with the second visual word;

conducting a multi-stage search including the steps of:
selecting candidate images from the plurality of images, selecting being executed by accessing an index, the index correlating a given one of visual features composite parameters of the images contained within the plurality of images and the matching ones from the images contained within the plurality of images;
validating candidate images vis-a-vis the search image using respective local descriptors.

12. The method of claim 11, wherein said geometric co-location information further comprises an angle associated with one key point relative to the first visual word relative to a location of one other key point associated with the second visual word.

13. The method of claim 11, wherein said relationship information further comprises visual relationship information associated with at least one of (i) between the first Page 6 of 17 local region and the second local region, (ii) other regions of the image; (iii) image as a whole.

14. The method of claim 13, wherein said visual relationship information comprises at least one of respective scales relationship, respective color relationship and respective contrast relationship.

15. The method of claim 11, wherein said relationship information further comprises at least one of (i) visual relationship information between the first local region and the second local region, (ii) spatial information associated with other regions of the image, (iii) visual information associated with other regions of the image.

16. The method of claim 11, wherein a respective one of the visual features composite parameter associated with a respective one of the images comprises a first visual word associated with a first region of the respective image, a second visual word associated with a second region of the respective image.

17. The method of claim 16, wherein the respective one of the visual features composite parameter further comprises relationship information between the first local region and the second local region, the relationship comprising a geometric co-location information of the first local region of the image and the second local region of the image, the geometric co-location information comprising a location of one key point associated with the first visual word and a location of one other key point associated with the second visual word.

18. The method of claim 17, wherein said geometric co-location information further comprises an angle associated with one key point relative to the first visual word relative to a location of one other key point associated with the second visual word.

19. The method of claim 17, wherein said relationship information comprises visual relationship information between the first local region and the second local region.

20. The method of claim 19, wherein said visual relationship information comprises at least one of respective scales relationship, respective color relationship and respective contrast relationship.

21. The method of claim 11, further comprising prior to said receiving, populating the index using the visual features composite parameter of the images.

22. A server comprising non-transient computer-readable medium storing computer-executable instructions, which instructions when executed are configured to render the server operable to execute a method of processing an image to enable indexing and comparison of the image against other images, the method comprising: identifying a first local region of the image and a second local region of the image; determining a first visual word associated with the first local region of the image and a second visual word associated with the second local region of the image, the first visual word and the second visual word being indicative of local descriptors of the first local region and of the second local region, a given local descriptor being indicative of visual features of a respective local region; determining a visual features composite parameter associated with the image, the visual features composite parameter comprising the first visual word and the second visual word, the visual features composite parameter further comprising relationship information characterizing a relationship between the first local region and the second local region, the relationship information comprising a geometric co-location information of the first local region of the image and the second local region of the image, the geometric co-location information comprising a location of one key point associated with the first visual word Page 8 of 17 relative to a location of one other key point associated with the second visual word; determining at least one key for an index of images, the at least one key including at least a portion of the visual features composite parameter associated with the image to be indexed; and storing an indication of the image matching the visual features composite parameter in a posting list associated with the at least one key.

23. A server comprising non-transient computer-readable medium storing computer-executable instructions, which instructions when executed are configured to render the server operable to execute a method of locating a match to an image from a repository of images, the repository of images containing a plurality of images, the method comprising:

receiving an indication of the image;

determining a search image visual features composite parameter associated with the image, the visual features composite parameter further comprising relationship information characterizing a relationship between a first local region associated with a first visual word and a second local region of the image associated with a second visual word, the first visual word and the second visual word being indicative of local descriptors of the first local region and of the second local region, a given local descriptor being indicative of visual features of a respective local region, the relationship information comprising a geometric co-location information of the first local region of the image and the second local region of the image, the geometric co-location information comprising a location of one key point associated with the first visual word relative to a location of one other key point associated with the second visual word;

conducting a multi-stage search including the steps of:
selecting candidate images from the plurality of images, selecting being executed by accessing an index, the index correlating a given one of visual features composite parameters of the images contained within the plurality of images and the matching ones from the images contained within the plurality of images;
validating candidate images vis-a-vis the search image using respective local descriptors.

* * * * *